United States Patent [19]

Hawley

[11] Patent Number: 4,537,870

[45] Date of Patent: Aug. 27, 1985

[54] POLYOLEFIN POLYMERIZATION PROCESS AND CATALYST

[75] Inventor: Gil R. Hawley, Bartlesville, Okla.

[73] Assignee: Phillips Petroleum Company, Bartlesville, Okla.

[21] Appl. No.: 630,172

[22] Filed: Jul. 12, 1984

[51] Int. Cl.[3] ............................ C08F 4/64; C08F 4/66
[52] U.S. Cl. .................................... 502/111; 502/104; 502/113; 502/119; 526/114; 526/119; 526/122; 526/125
[58] Field of Search ................ 502/111, 104, 113, 119

[56] References Cited

U.S. PATENT DOCUMENTS

| | | | |
|---|---|---|---|
| 3,094,568 | 6/1963 | Hay et al. | 502/117 X |
| 4,384,087 | 5/1983 | Capshew | 526/114 |
| 4,394,291 | 7/1983 | Hawley | 502/117 |
| 4,477,588 | 10/1984 | Hawley | 502/119 |

*Primary Examiner*—Patrick P. Garvin
*Attorney, Agent, or Firm*—Edward L. Bowman

[57] ABSTRACT

A catalyst prepared by reacting a dihalide, such as $MgCl_2$; a titanium compound, such as a titanium tetraalkoxide; and an electron donor to form a first catalyst component; then reacting that component with an organoaluminum halide; then reacting the resulting solid with $TiCl_4$; and then reacting the solid after that step with $HSiCl_3$. Also the use of the catalyst in olefin polymerization is disclosed.

12 Claims, No Drawings

POLYOLEFIN POLYMERIZATION PROCESS AND CATALYST

The present invention relates to the polymerization of olefins. In another aspect, this invention relates to novel catalysts useful for the polymerization of olefins.

U.S. Pat. No. 4,394,291 discloses a number of highly active olefin polymerization catalysts prepared by (1) reacting (a) a metal dihalide, such as $MgCl_2$, (b) an electron donor, such as a phenol, and (c) a titanium compound, such as titanium tetra-n-butoxide, to form a first catalyst component and then (2) reacting that component with an organoaluminum precipitating agent, and then reacting the resulting solid with an activating component comprising a halogenating agent. Some typical examples of the halogenating agent include $TiCl_4$, $SiCl_4$, $HSiCl_3$. The patent shows that $TiCl_4$ produces more active catalysts than $SiCl_4$ and that combinations of $TiCl_4$ and $SiCl_4$ or $TiCl_4$ and $HSiCl_3$ can produce even more active catalysts than those produced using only $TiCl_4$. More recently the same inventor has discovered that combinations of $TiCl_4$, $SiCl_4$, and $HSiCl_3$ can give still better catalysts.

An object of the present invention is to provide catalysts that are even more active than those produced using a mixture of $TiCl_4$, $SiCl_4$, and $HSiCl_3$ as the activating component.

SUMMARY OF THE INVENTION

In accordance with the present invention a catalyst is produced by (1) reacting (a) a metal dihalide selected from Groups IIA and IIB, (b) a transition metal compound, and (c) an electron donor to form a first catalyst component, (2) reacting said first catalyst component with an organoaluminum precipitating agent, then (3) reacting the resulting solid with $TiCl_4$, and then (4) reacting that resulting solid with $HSiCl_3$.

DETAILED DESCRIPTION

Examples of Group IIA and IIB metal dihalides that can be used in forming the first component of the catalyst, include for example, the dihalides of beryllium, magnesium, calcium, and zinc.ABS dichlorides are preferred. Magnesium dichloride is preferred because it is readily available and relatively inexpensive and has provided excellent results. While "anhydrous" metal dihalides, i.e. dihalides containing less than 1 mole of water per mole can be used it has been found that the activity of the catalyst can be increased somewhat if the metal dihalide has small amounts of water or alkanol associated with it. For example, when magnesium dichloride is used it has been found that more optimum results are obtained if the $MgCl_2$ has a $H_2O$ to $MgCl_2$ molar ratio in the range of 1/1 to 1.5/1 or an alkanol to $MgCl_2$ molar ratio in the range of 0.2/1 to 1.5/1, more preferably in the range of 0.5/1 to 1.1/1.

The transition metal compounds comprise those wherein the transition metal is selected from the Groups IVB and VB and the transition metal is bonded to at least one atom selected from the group consisting of oxygen, nitrogen, and sulfur, and said oxygen nitrogen and sulfur atoms are in turn bonded to a carbon of a carbon-containing radical.

The transition metal is generally selected from titanium, zirconium, and vanadium although other transition metals can be employed. Excellent results have been obtained with titanium compounds and they are preferred. Some of the titanium compounds suitable for use in the invention include for example titanium tetrahydrocarbyloxides, titanium tetraimides, titanium tetraamides and titanium tetramercaptides. Other transition metal compounds include, for example, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula $$Ti(OR)_4$$

wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to 10 carbon atoms per radical are most often employed because they are more readily available. Suitable titanium tetrahydrocarbyloxides include, for example, titanium tetramethoxide, titanium dimethoxidediethoxide, titanium titraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetra-n-butoxide is particularly preferred because of the excellent results obtained employing this material. Titanium tetra-n-butoxide is also generally available at a reasonable cost.

The molar ratio of the transition metal compound to the metal halide compound can be selected over a relatively broad range. Generally the molar ratio is within the range of about 10:1 to about 1:10, however, the most common molar ratios are within the range of about 2:1 to about 1:2. When titanium tetrahydrocarbyloxide and magnesium dichloride are employed to form a composition of matter of the invention, a molar ratio of titanium to magnesium of about 1:2 is presently recommended as all the magnesium compound apparently goes into solution easily.

Examples of electron donors suitable for use in making the first catalyst component include electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e. thiophenols. The preferred compounds are aromatic compounds selected from the group consisting of phenols, thiophenols, naphthols, aralkyl alcohols, aromatic acids, and aromatic esters.

The mole ratio of electron donor to transition metal compound employed in step (1) can vary over a wide range. Generally, however, that mole ratio will be in the range of about 5:1 to 1:5, preferably about 1:1 to 2:1.

In accordance with an especially preferred embodiment a phenol and an aromatic ester are employed in the reaction between the transition metal compound and the dihalide compound. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably ½ mole of ethyl benzoate is employed per mole of titanium alkoxide.

The first catalyst component is prepared by heating the reactants together in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures. Such mixing temperatures are generally within the range of from about 0° C. to about 50° C. and preferably from about 10° C. to about 30° C. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed could be higher if the pressure employed is above atmospheric pressure. The pressure employed during the heating step does not appear to be a significant parameter. In addition to the above noted solvents or diluents, more polar solvents or diluents such as nitrobenzene and halogenated hydrocarbons, e.g. methylene chloride, chlorobenzene and 1,2-dichloroethane can be used. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating the reactants together in the first step is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired.

The organoaluminum precipitating agent is selected from compounds having the general formulas $AlR_nX_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, triethylaluminum, dicyclohexylaluminum bromide, dieicosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

The reaction with the organoaluminum can also be carried out either in the presence of a liquid diluent or in the absence of such diluent, when at least one of the reagents is in the liquid state. Preferably, a liquid solution of the product of the reaction of the dihalide and the transition metal compound is contacted with a hydrocarbon solution of the aluminum halide.

The temperature employed while mixing the first and second catalyst components as above described can be selected over a broad range. Generally the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

In accordance with this invention, the catalyst component resulting from the reaction of the dihalide, the electron donor, the transition metal compound, and the organoaluminum compound is then reacted with $TiCl_4$ in a first activation step and then with $HSiCl_3$ in a second activation step.

The activation steps can be carried out using the halogenating agents diluted in a liquid; however, since both are liquid, it is preferable to use them neat.

The temperature employed in the activating step can be selected over a relatively broad range, generally in the range of −25° C. to 250° C., preferably 0° C. to 200° C., with temperatures of about 100° C. being most preferred.

The time of each activation step can also vary over a wide range, but is generally within the range of about 10 minutes to about 10 hours. While the weight ratio of the halide ion exchanging source to the solid can be selected over a broad range, typically for practical purposes it would be in the range of about 10/1 to about 1/10, and more generally about 7/1 to 1/4.

It is possible to conduct the second activation steps by just adding the HSiCl$_4$ to the liquid remaining after the first activation step. However, it is preferred to remove substantially all the liquid TiCl$_4$ from the solid before contacting the solid with the HSiCl$_4$. In a preferred embodiment the solid from the first activation step is washed several times with a hydrocarbon liquid before the solid is subjected to the next activation treatment. Typical liquids for such washing would be n-pentene, n-heptane, n-hexane, cyclohexane, benzene, xylene, or the like. Such a hydrocarbon cracking is preferably used after the second activation as well.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and-/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula R$_3$Al which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenyl-aluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5—3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPA to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples illustrating a few embodiments of the invention.

EXAMPLE I

Catalyst Preparation

Under argon in a dry box, six 1 qt (0.95 L) glass beverage bottles were each charged in order with the following components: 19.8 g of less than 50 mesh size dry $MgCl_2 \cdot 0.5H_2O$ equivalent to 189 mmoles anhydrous $MgCl_2$, 25 g (147 mmoles) of 4-phenylphenol (abbreviated hereafter as 4-PP), 150 mL of reagent grade xylenes (boiling range of about 137° to 144° C.), and 35.8 mL (104 mmoles) of titanium tetra-n-butoxide (abbreviated hereafter as Ti(OBu)4). Each bottle was capped, removed from the dry box and heated at 100° C. for 15 minutes with stirring (magnetic stir bar). Then each bottle was charged by syringe with 7.5 mL (53 mmoles) of ethyl benzoate (abbreviated hereafter as EB). Each mixture was heated an additional 45 minutes at 100° C. with stirring, then the bottles were diluted with 500 mL of the room temperature xylenes and treated dropwise, with stirring, with 125 mL (96 mmoles) of ethylaluminum sesquichloride (EASC) contained as a 25 weight percent solution in n-heptane. Dark brown solutions containing precipitates resulted. The solids in each bottle were isolated by centrifugation, washed repeatedly by slurrying in n-hexane followed by centrifugation until the supernatant liquid was colorless or nearly colorless. The solids were dried by standing overnight in the dry box, each yielding a dark yellow particulate solid.

The solids, after weighing, were returned to the 1 qt bottles and slurried in neat halide-containing activating agents described below. The bottles were then capped and removed from the dry box.

Samples 1, 2, 3, 4 were slurried in about 125 mL of a mixture consisting of $TiCl_4$: 55.6 weight percent (48.7 mole percent), $HSiCl_3$: 32.4 weight percent (39.6 mole percent), and $SiCl_4$: 12.0 weight percent (11.7 mole percent). The slurries were heated at 100° C. for 1 hour with stirring, cooled to room temperature and returned to the dry box for recovery.

Sample 5 was slurried in about 125 mL of $TiCl_4$, heated for 1 hour at 100° C. with stirring, cooled to room temperature and returned to the dry box.

Sample 6 was slurried in about 125 mL of $HSiCl_3$, heated for 1 hour at 100° C. with stirring, cooled to room temperature and returned to the dry box.

Each solid product was isolated by vacuum filtration; washed repeatedly with portion of n-hexane until the filtrate was colorless and then allowed to dry by standing overnight in the dry box. Each product obtained was purple in color.

Sample 1, prior to activation in the halide mixture, weighed 28.5 g. After activation, the resulting comparison catalyst weighed 25.1 g.

Sample 2, prior to activation in the halide mixture, weighed 30.9 g. After activation, the resulting comparison catalyst weighed 25.1 g.

Sample 3, prior to activation in the halides mixture, weighed 24.4 g. After activation, the resulting comparison catalyst weighed 21.9 g.

Sample 4, prior to activation in the halides mixture, weighed 32.6 g. After activation, the resulting comparison catalyst weighed 23.5 g.

Sample 5, prior to activation in $TiCl_4$ weighed 26.8 g and after activation the resulting comparison catalyst weighed 23.3 g. A small portion of it was retained for later testing.

Sample 6, prior to activation in $HSiCl_3$ weighed 28.6 g and after activation the resulting comparison catalyst weighed 23.7 g. A small portion of it was retained for later testing.

The remaining portion of $TiCl_4$—activated sample 5, about 23 g, was then slurried in about 125 mL of neat $HSiCl_3$, heated for 1 hour with stirring at 100° C., then recovered as before. The isolated sample, now identified as sample 7, the resulting invention catalyst weighed 26.2 g.

The remaining portion of $HSiCl_3$—activated sample 6, about 23.5 g, was then slurried in about 125 mL of neat $TiCl_4$, heated for 1 hour with stirring at 100° C., then recovered as before. The isolated sample, now identified as sample 8, the resulting comparison catalyst weighed 22.7 g.

EXAMPLE II

Propylene Polymerization

To a dry, stirred, stainless steel reactor of 1 L capacity at 70° C. was charged in order under a nitrogen purge, 2.00 mmoles of triethylaluminum as a 0.62 M solution in n-hexane premixed with 1.10 mmoles of ethyl anisate, a weighed portion of the catalyst, 2.00 mmoles of diethylaluminum chloride as a 0.874 M solution in n-hexane, 10 psi hydrogen and sufficient liquid propylene to fill the reactor about 2/3 full. The reactor temperature was adjusted to 70° C. as the reactor was filled liquid full with additional propylene from a pressurized reservoir and the 1 hour polymerization run was started. The liquid full condition was maintained during each run by the addition of propylene as needed from the reservoir.

Each run was terminated by discontinuing heating and flashing gaseous propylene from the reactor. The liquid propylene remaining in the reactor was drained into a tared receiver. The polypropylene product in the reactor was then admixed with fresh liquid propylene and that propylene then drained into the tared receiver. The propylene-soluble polymer produced was determined by evaporating the propylene and weighing the residue. The polypropylene in the reactor was removed, dried, weighed and stabilized with a conventional antioxidant, e.g. 2,6-di-t-butyl-4-methylphenol, as known in the art.

Xylene-soluble polymer measurements were determined from a sample of the dried, stabilized polymer produced in each run as known in the art.

Calculated productivity was determined by dividing the weight of high molecular weight polypropylene (excludes propylene-soluble polymer) by the weight of solid catalyst used. It is expressed as kg polypropylene per g solid catalyst per hour.

Melt flow, g/10 minutes, was determined in accordance with ASTM D 1238, condition L.

Flexural modulus, MPa, was determined in accordance with ASTM D 790.

The results obtained are given in Table 1.

TABLE 1

| | | | Propylene Polymerization, 70° C. | | | | | |
|---|---|---|---|---|---|---|---|---|
| | | Catalyst | Polymer | Calculated | Wt. | | Melt | Flex. |
| Run | Sample | | Yield | Productivity | Percent Solubles | | Flow | Mod. |
| No. | No. | Activating Agent | g$^{(b)}$ | kg/g/hr. | propylene | xylene | g/10 min | MPa |
| 1$^{(a)}$ | (1–4) | TiCl$_4$ + SiCl$_4$ + HSiCl$_3$ | 71.8 | 6.69 | 1.5 | 1.5 | 2.4 | 1683 |
| 2 | 5 | TiCl$_4$ only | 28.1 | 7.03 | 2.8 | 2.6 | 1.8 | 1567 |
| 3 | 6 | HSiCl$_3$ only | 1.7 | 0.221 | 49 | 3.7 | —$^{(c)}$ | — |
| 4$^{(d)}$ | 7 | TiCl$_4$ then HSiCl$_3$ | 117.1 | 11.8 | 1.2 | 2.3 | 2.6 | 1593 |
| 5 | 8 | HSiCl$_3$ then TiCl$_4$ | 14.7 | 1.11 | 14 | 2.3 | 1.6 | — |

Notes:
$^{(a)}$Average of 4 runs using catalyst samples 1, 2, 3, 4. In these runs, polymer yields were 96.2, 57.4, 60.00 and 73.5 g. Calculated productivities, corresponding to the polymer yields, were 9.82, 5.57, 5.22 and 6.17 kg/g/hr. Propylene solubles obtained were 1.2, 1.7, 0.85 and 2.2 weight percent, respectively. Xylene solubles were 1.4, 1.5, 1.6, and 1.6 weight percent, respectively.
$^{(b)}$Polymer yield excluding propylene-soluble polymer.
$^{(c)}$A dash signifies no determination was made.
$^{(d)}$Invention run, all other runs are comparison.

The productivity results in Table 1 show in invention run 4 and in comparison runs 1, 2 that TiCl$_4$ must be present in the initial activating agent in order to obtain a catalyst possessing sufficient activity to be of commercial interest in propylene polymerization. When HSiCl$_3$ is the initial activating agent, low productivity results as shown by the 0.221 and 1.11 kg/g/hr obtained in comparison runs 3, 5 are obtained.

The unexpected productivity results of 11.8 kg polypropylene per g catalyst per hour in invention run 4 of the instant invention are substantially higher than the results obtained with the comparison catalysts and demonstrate the utility of the invention catalyst in propylene polymerization. The total solubles level of 3.5 weight percent (1.2 weight percent propylene solubles and 2.3 weight percent xylene solubles) obtained with the invention catalyst ranged from slightly higher to about the same as those obtained with comparison catalysts 1–4 as shown in footnote (a) of Table 1. The total solubles level of about 3.5 weight percent is deemed to be commercially acceptable.

The various melt flow values ranging from 1.6 to 2.6 g/10 minutes and flexural modulus values ranging from 1567 to 1683 shown in Table 1 are indicative of propylene homopolymers which are commercially attractive for various fiber, film and molding applications.

What is claimed is:

1. A process for preparing a catalyst comprising (1) reacting (a) a metal dihalide selected from Groups IIA and IIB, (b) a transition metal compound, wherein the transition metal is selected from Groups IVB and VB transition metals and is bonded to at least one atom selected from the group consisting of oxygen, nitrogen, and sulfur, said atom in turn being bonded to the carbon atom of an organic radical, and (c) at least one electron donor to form a first catalyst component; (2) reacting said first catalyst component with an organoaluminum precipitating agent selected from compounds of the general formula $$AlR_nX_{3-n}$$

wherein each R is individually selected from saturated and unsaturated hydrocarbyl radicals containing 1 to 20 carbon atoms per radical, X is halogen, an n is any number such that $1 \leq n \leq 2$; then (3) reacting the resulting solid with TiCl$_4$, and (4) then reacting that resulting solid with HSiCl$_3$.

2. A process according to claim 1 wherein said transition metal compound comprises a titanium tetrahydrocarbyloxide of the formula $$Ti(OR)_4$$

wherein each R is individually selected from an alkyl, cycloalkyl, aryl, alkylaryl or aralkyl radical containing 1 to 2 carbon atoms.

3. A process according to claim 2 wherein said metal dihalide comprises magnesium dichloride.

4. A process according to claim 3 wherein said electron donor comprises a phenol.

5. A process according to claim 4 wherein said electron donor comprises 4-phenyl-phenol and ethyl benzoate.

6. A process according to claim 6 wherein said transition metal compound is titanium tetra-n-butoxide.

7. A process according to claim 6 wherein said precipitating agent is ethyl aluminum sesquichloride.

8. A process according to claim 7 wherein said magnesium dichloride consists essentially of magnesium dichloride having 1 to 1.5 moles of water per mole of magnesium dichloride.

9. A process according to claim 7 wherein said magnesium chloride consists essentially of magnesium dichloride having 0.2 to 1.5 moles of methanol per mole of magnesium dichloride.

10. A catalyst produced by the process of claim 8.

11. A catalyst produced by the process of claim 9.

12. A catalyst produced by the process of claim 1.

* * * * *